(12) United States Patent
Toda et al.

(10) Patent No.: US 9,947,446 B2
(45) Date of Patent: *Apr. 17, 2018

(54) HOT-ROLLED STEEL SHEET FOR PRODUCTION OF NON-ORIENTED ELECTRICAL STEEL SHEET AND METHOD OF MANUFACTURING SAME

(71) Applicant: JFE Steel Corporation, Tokyo (JP)

(72) Inventors: Hiroaki Toda, Tokyo (JP); Yoshiaki Zaizen, Tokyo (JP); Tadashi Nakanishi, Tokyo (JP); Yoshihiko Oda, Tokyo (JP)

(73) Assignee: JFE Steel Corporation (JP)

( * ) Notice: Subject to any disclaimer, the term of this patent is extended or adjusted under 35 U.S.C. 154(b) by 294 days.

This patent is subject to a terminal disclaimer.

(21) Appl. No.: 14/435,314

(22) PCT Filed: Oct. 11, 2013

(86) PCT No.: PCT/JP2013/006076
§ 371 (c)(1),
(2) Date: Apr. 13, 2015

(87) PCT Pub. No.: WO2014/061246
PCT Pub. Date: Apr. 24, 2014

(65) Prior Publication Data
US 2015/0270042 A1    Sep. 24, 2015

(30) Foreign Application Priority Data
Oct. 16, 2012 (JP) .................. 2012-229230

(51) Int. Cl.
*C21D 8/02* (2006.01)
*C22C 38/02* (2006.01)
(Continued)

(52) U.S. Cl.
CPC ......... *H01F 1/14775* (2013.01); *B21B 1/026* (2013.01); *B21B 15/00* (2013.01);
(Continued)

(58) Field of Classification Search
CPC ......... C22C 38/02; C22C 38/04; C22C 38/06; C21D 8/02
(Continued)

(56) References Cited

U.S. PATENT DOCUMENTS 4,661,174 A    4/1987   Miyoshi et al.
5,102,478 A    4/1992   Hosoya et al.
(Continued)

FOREIGN PATENT DOCUMENTS

CN    1343262    4/2002
CN    1520464    8/2004
(Continued)

OTHER PUBLICATIONS

Chinese Office Action dated Jan. 18, 2016 of corresponding Chinese Application No. 201380053402.1, along with an English translation of the Search Report.
(Continued)

*Primary Examiner* — Brian Walck
(74) *Attorney, Agent, or Firm* — DLA Piper LLP (US)

(57) ABSTRACT

The pickling loss when a hot-rolled steel sheet having a predetermined chemical composition is annealed at 1000° C. for 30 seconds in a nitrogen atmosphere and then immersed in a solution of 7% HCl at 80° C. for 60 seconds is in a range of 40 g/m² or more and 100 g/m² or less. A hot-rolled steel sheet for production of a non-oriented electrical steel sheet with not only excellent magnetic properties such as iron loss and magnetic flux density but also excellent recyclability and steel sheet surface appearance can thus be obtained.

4 Claims, 4 Drawing Sheets

(51) Int. Cl.
*H01F 1/147* (2006.01)
*C21D 8/12* (2006.01)
*C22C 38/12* (2006.01)
*C22C 38/60* (2006.01)
*H01F 1/16* (2006.01)
*C22C 38/34* (2006.01)
*B21B 1/02* (2006.01)
*B21B 15/00* (2006.01)
*C22C 38/00* (2006.01)
*C22C 38/04* (2006.01)
*C22C 38/06* (2006.01)
*H01F 41/02* (2006.01)

(52) U.S. Cl.
CPC ............ *C21D 8/12* (2013.01); *C21D 8/1222* (2013.01); *C21D 8/1261* (2013.01); *C21D 8/1277* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/12* (2013.01); *C22C 38/34* (2013.01); *C22C 38/60* (2013.01); *H01F 1/16* (2013.01); *H01F 41/02* (2013.01); *Y02P 10/212* (2015.11)

(58) Field of Classification Search
USPC .......................... 148/320, 334; 420/84, 123
See application file for complete search history.

(56) References Cited

U.S. PATENT DOCUMENTS

| | | | |
|---|---|---|---|
| 6,558,815 B1 | 5/2003 | Suzuki et al. | |
| 2004/0016530 A1 | 1/2004 | Schoen et al. | |
| 2004/0149355 A1* | 8/2004 | Kohno | C21D 8/12 148/111 |
| 2007/0023103 A1 | 2/2007 | Schoen et al. | |
| 2008/0060728 A1 | 3/2008 | Kohno et al. | |
| 2009/0202383 A1* | 8/2009 | Tanaka | C22C 38/004 420/83 |

FOREIGN PATENT DOCUMENTS

| | | |
|---|---|---|
| JP | 58-151453 | 9/1983 |
| JP | 58-181822 | 10/1983 |
| JP | 2-221326 | 9/1990 |
| JP | 3-281758 | 12/1991 |
| JP | 3-294422 | 12/1991 |
| JP | 6-108149 | 4/1994 |
| JP | 8-269756 | 10/1996 |
| JP | 10-30123 | 2/1998 |
| JP | 2003-41322 | 2/2003 |
| JP | 2006-501361 | 1/2006 |
| JP | 3888033 | 2/2007 |
| JP | 2007-516345 | 6/2007 |
| JP | 4126479 | 7/2008 |
| JP | 4258951 | 4/2009 |
| JP | 4258952 | 4/2009 |
| JP | 2012-149337 | 8/2012 |

OTHER PUBLICATIONS

Canadian Office Action dated Aug. 2, 2016, of corresponding Canadian Application No. 2,884,851.
Korean Office Action dated Aug. 8, 2016, of corresponding Korean Application No. 2015-7008889, along with a Concise Statement of Relevance of Office Action in English.
Japanese Office Action dated Sep. 6, 2016, of corresponding Japanese Application No. 2012-229230, along with a Concise Statement of Relevance of Office Action in English.
Chinese Office Action dated Sep. 18, 2016, of corresponding Chinese Application No. 201380053402.1, along with a Concise Statement of Relevance of Office Action in English.
Taiwanese Office Action dated Jan. 23, 2015 from corresponding Taiwanese Patent Application No. 102137136 along with an English translation.
Supplementary European Search Report dated Oct. 23, 2015 of corresponding European Application No. 13847855.7.
Canadian Office Action dated Mar. 13, 2017, of corresponding Canadian Application No. 2,884,851.
Chinese Office Action dated Mar. 23, 2017, of corresponding Chinese Application No. 201380053402.1, along with a Concise Statement of Relevance of Office Action in English.

* cited by examiner

HOT-ROLLED STEEL SHEET FOR PRODUCTION OF NON-ORIENTED ELECTRICAL STEEL SHEET AND METHOD OF MANUFACTURING SAME

TECHNICAL FIELD

This disclosure relates to a hot-rolled steel sheet for a non-oriented electrical steel sheet mainly used as an iron core material of electrical equipment, and a method of manufacturing the hot-rolled steel sheet. The disclosure particularly relates to a hot-rolled steel sheet for production of a non-oriented electrical steel sheet with not only excellent magnetic properties such as iron loss and magnetic flux density but also excellent recyclability and steel sheet surface appearance, and a method of manufacturing the hot-rolled steel sheet.

BACKGROUND

In the global movement to save energy such as electric power in recent years, there has been strong demand for higher efficiency of electrical equipment. There has also been increasing demand especially for smaller iron core materials, to reduce the size of electrical equipment. Moreover, recent environmental consciousness has raised urgent demand to accommodate recycling of iron core materials of electrical equipment.

Of the above-mentioned demands, higher efficiency of electrical equipment and smaller iron core materials are effectively realized by improving the magnetic properties of an electrical steel sheet which is a material of an iron core. In the field of conventional non-oriented electrical steel sheets, a technique of increasing the content of Si, Al, Mn and the like in steel to increase the electrical resistance and reduce the eddy current loss has been typically used as means to reduce especially the iron loss from among the magnetic properties.

However, that technique has a fundamental problem of inevitably causing a decrease in magnetic flux density.

Techniques of not only increasing the content of Si, Al and the like but also either decreasing C and S or increasing alloy content such as adding B as described in JP S58-151453 A or adding Ni as described in JP H3-281758 A, are also commonly known as a means to reduce eddy current loss.

Those techniques of adding alloy components improve the iron loss property, but are unsatisfactory in that they have little effect in improving the magnetic flux density. Besides, with alloy addition, the steel sheet increases in hardness and decreases in workability. Such a non-oriented electrical steel sheet has poor versatility even when processed and used in electrical equipment, and its use is significantly limited.

Several methods of changing the manufacturing process and improving the degree of integration of crystal orientation in a product sheet, i.e. the texture, to improve the magnetic properties have been proposed. For example, JP S58-181822 A discloses a method whereby steel containing 2.8 to 4.0 mass % Si and 0.3 to 2.0 mass % Al is warm rolled in a temperature range from 200° C. to 500° C. to develop {100}<UVW> texture. JP H3-294422 A discloses a method whereby steel containing 1.5 to 4.0 mass % Si and 0.1 to 2.0 mass % Al is hot-rolled and then subjected to a combination of hot band annealing at 1000° C. or more and 1200° C. or less and cold rolling at a reduction ratio of 80% to 90% to develop {100} texture.

However, the magnetic property improvement effects and in particular the magnetic flux density improvement effects by those methods are still unsatisfactory, and the issues of workability and recyclability remain unsolved. In detail, if Al is contained in steel to a certain extent or more, the hardness of the steel sheet increases, which causes problems such as impairing the workability and, when the iron core material is recycled or scrapped by a user, damaging electrodes of an electric furnace.

The following problem remains, too. In casting a motor shaft or the like using the recycled material of the iron core, if 0.1 mass % or more Al is contained, the molten steel is susceptible to surface oxidation and the viscosity increases during casting, as a result of which the mold-filling ability of the molten steel deteriorates. This hampers a sound casting.

To solve the above-mentioned problems, each of JP 3888033 B where Al content is 0.02% or less, JP 4126479 B where Al content is 0.017% or less, JP 4258951 B where Al content is 0.010% or less, and JP 4258952 B where Al content is 0.030% or less discloses a technique of manufacturing a non-oriented electrical steel sheet with high magnetic flux density and low iron loss by reducing the amount of impurities such as S and N and controlling the average grain size after hot band annealing, the cold rolling conditions or the like.

However, reducing the Al content according to the above-mentioned techniques causes a new problem of poor stability in magnetic properties. Besides, the steel sheet after final annealing clearly has poor surface appearance such as a noticeable whitish stripe pattern or the like.

It could therefore be helpful to provide a hot-rolled steel sheet for production of a non-oriented electrical steel sheet with not only excellent magnetic properties such as iron loss and magnetic flux density but also excellent recyclability and steel sheet surface appearance, and an advantageous method of manufacturing the hot-rolled steel sheet.

SUMMARY

We thus provide:

1. A hot-rolled steel sheet for production of a non-oriented electrical steel sheet, the hot-rolled steel sheet having a chemical composition containing, in mass %: 0.005% or less C; 1.5% or more and 4.5% or less Si; 0.005% or less Al; 0.20% or less Mn; 0.003% or less S; 0.003% or less N; 0.03% or more and 0.2% or less P; and 0.002% or more and 0.03% or less Mo with balance being Fe and incidental impurities, wherein pickling loss when the hot-rolled steel sheet is annealed at 1000° C. for 30 seconds in a nitrogen atmosphere and then immersed in a solution of 7% HCl at 80° C. for 60 seconds is 40 g/m² or more and 100 g/m² or less.

2. The hot-rolled steel sheet for production of a non-oriented electrical steel sheet according to the foregoing 1, wherein the hot-rolled steel sheet further contains, in mass %, at least one selected from: 0.005% or more and 0.2% or less Sb; 0.005% or more and 0.2% or less Sn; 0.001% or more and 0.005% or less Ca; and 0.05% or more and 0.5% or less Cr.

3. A method of manufacturing a hot-rolled steel sheet for production of a non-oriented electrical steel sheet, the method including:

heating a slab having a chemical composition containing, in mass %: 0.005% or less C; 1.5% or more and 4.5% or less Si; 0.005% or less Al; 0.20% or less Mn; 0.003% or less S;

0.003% or less N; 0.03% or more and 0.2% or less P; and 0.002% or more and 0.03% or less Mo with balance being Fe and incidental impurities;

hot rolling the slab to obtain a hot-rolled steel sheet; and coiling the hot-rolled steel sheet, wherein a finisher delivery temperature in the hot rolling is 825° C. or more and 925° C. or less, and a coiling temperature after completion of the hot rolling is 525° C. or more and 650° C. or less.

4. The method of manufacturing a hot-rolled steel sheet for production of a non-oriented electrical steel sheet according to the foregoing 3, wherein the slab further contains, in mass %, at least one selected from: 0.005% or more and 0.2% or less Sb; 0.005% or more and 0.2% or less Sn; 0.001% or more and 0.005% or less Ca; and 0.05% or more and 0.5% or less Cr.

It is possible to provide a hot-rolled steel sheet for production of a non-oriented electrical steel sheet with excellent recyclability, fine surface appearance, high magnetic flux density, and low iron loss, and an advantageous method of manufacturing the hot-rolled steel sheet.

BRIEF DESCRIPTION OF THE DRAWINGS

Our steel sheets and methods will be further described below with reference to the accompanying drawings, wherein.

DETAILED DESCRIPTION

Figure 1:
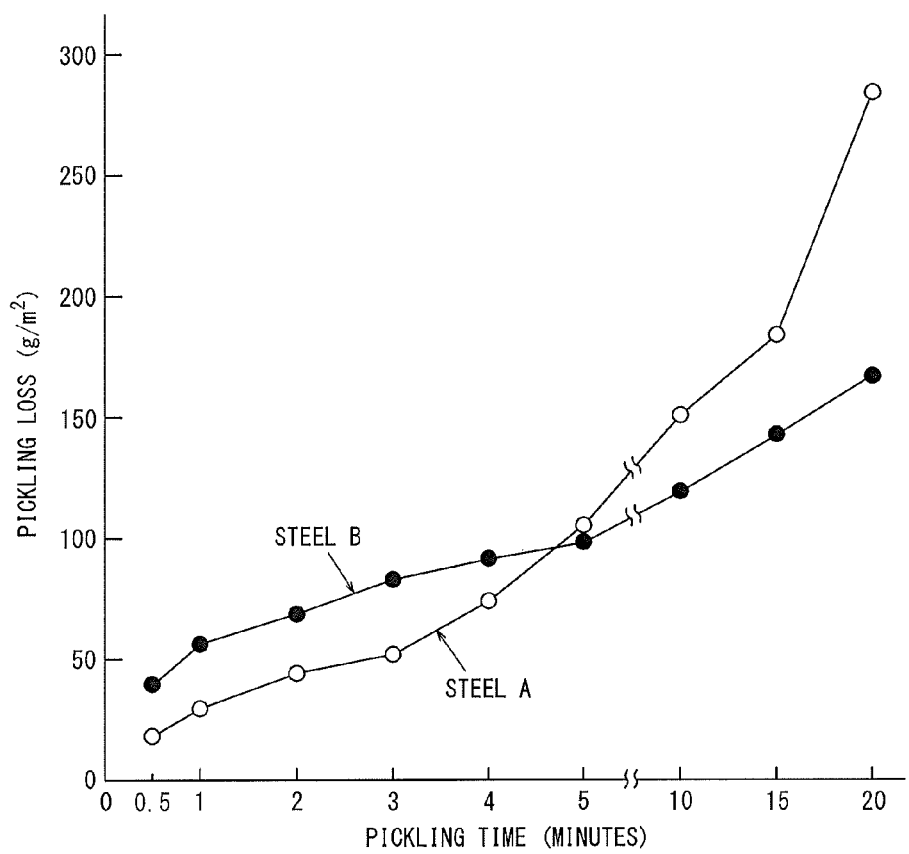
FIG. 1 is a diagram showing the result of collecting samples after hot band annealing and before pickling and studying the relationship between the pickling time and the pickling loss.

We investigated the reason why reducing Al, which is problematic in terms of recyclability, tends to cause poor stability in magnetic properties and poor surface appearance when manufacturing a material with high magnetic flux density and low iron loss.

As a result, we found that $SiO_2$ scale after hot band annealing increases as the Al content in the steel sheet decreases, and tends to remain as it is hard to be removed even by subsequent pickling and the like, thus causing poor surface appearance such as a noticeable whitish stripe pattern on the surface of the steel sheet after final annealing. We also found that the iron loss property deteriorates due to surface layer oxides causing such a stripe pattern.

The cause of this phenomenon can be explained as follows. When the Al content is high, Al oxide is generated on the surface of the steel sheet, and its barrier effect suppresses the generation of $SiO_2$ scale. When the Al content is low, on the other hand, the barrier effect is small and so the oxidation of Si progresses easily, resulting in a lot of $SiO_2$ scale generated on the surface of the steel sheet.

From a microscopic point of view, more variations in the amount of generated $SiO_2$ scale are believed to lead to more variations in the extent of scale removal by pickling.

We thus found that it is important to facilitate the removal of scale after hot band annealing.

We then studied the types of additive elements and the like and discovered a method of facilitating the removal of scale.

As a result, we found that adding P improves the pickling property of the steel sheet and facilitates removal of scale after hot band annealing. We also found, however, that the amount of generated scale after hot band annealing differs significantly depending on region, and an iron portion in a region where scale is removed in an initial stage of pickling is excessively removed.

We then discovered that further adding Mo is very effective in suppressing excessive removal of iron in the region where scale is removed.

In other words, we found that the inclusion of predetermined amounts of both P and Mo is the most effective solution to the above-mentioned scale removal.

Our steel sheets and methods are described in detail below. The following % representation indicating each steel sheet component is mass % unless stated otherwise.

The experimental results are described first.

First, to study the effect of the addition of P and Mo on the pickling loss after hot band annealing which influences the magnetic properties and the surface appearance, steel A of a composition containing 0.0016% C, 3.0% Si, 0.0005% Al, 0.15% Mn, 0.0018% S, and 0.0021% N and steel B of a composition containing 0.0021% C, 3.0% Si, 0.0007% Al, 0.12% Mn, 0.0022% S, 0.0015% N, 0.06% P, and 0.005% Mo, which were prepared by steelmaking, heated at 1100° C., and then hot-rolled to a thickness of 2.2 mm in a laboratory. Following this, the hot-rolled steel sheets were subjected to hot band annealing at 1000° C. for 30 seconds in a 100% $N_2$ atmosphere. The sheets were then pickled under the conditions of 7% HCl and 80° C. while changing the pickling time. After this, the sheets were cold rolled to a sheet thickness of 0.50 mm, and subjected to final annealing at 1025° C. for 10 seconds in a 20% $H_2$ and 80% $N_2$ atmosphere.

Apart from this, the samples after hot band annealing and before pickling were collected, and the relationship between the pickling time and the pickling loss was studied. FIG. 1 shows the result. As seen from FIG. 1, both steel A and steel B have a tendency that the pickling loss increases as the pickling time increases. The steel B to which Mo is added together with P, however, has a tendency that, though the pickling loss in shorter time is slightly larger, the increase of the pickling loss in longer time is reduced.

Figure 2:
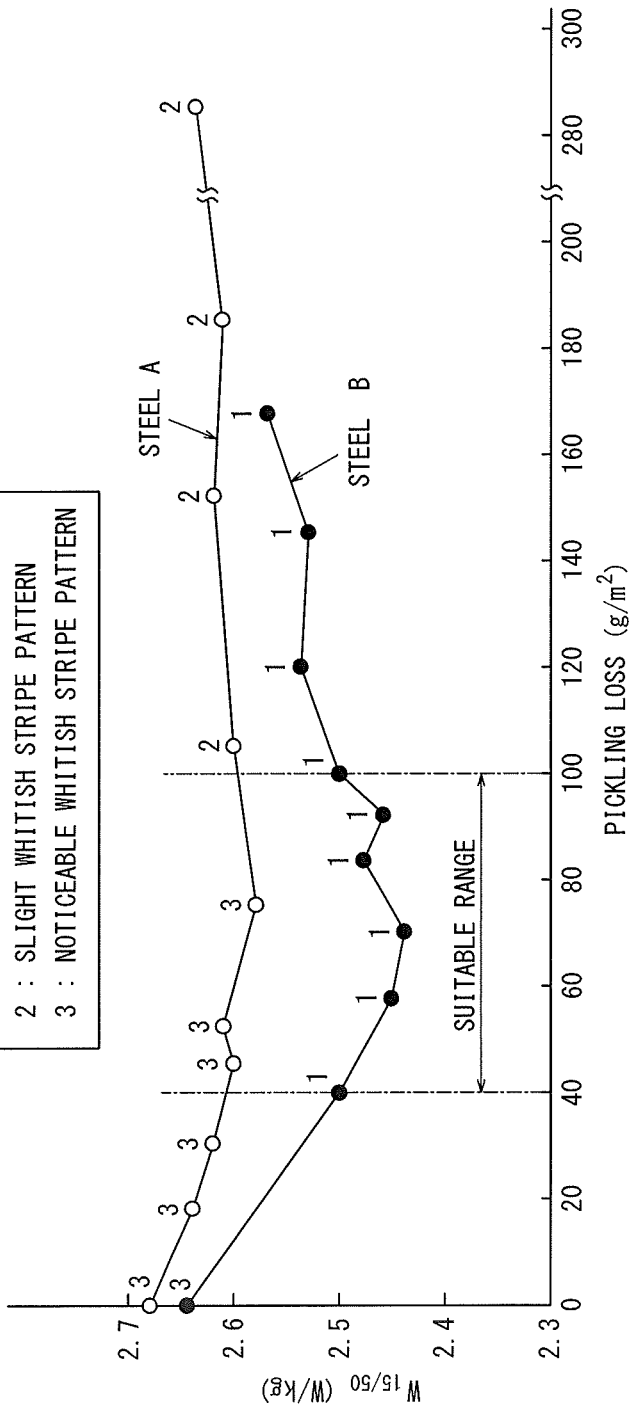
FIG. 2 is a diagram showing the result of studying the relationship between the iron loss $W_{15/150}$ and the pickling loss of each sample after hot band annealing and the influence on the surface appearance.

FIG. 2 shows the result of studying, for each of these materials under test, the relationship between the iron loss $W_{15/50}$ and the pickling loss of the material under test after hot band annealing, and the surface appearance. As seen from FIG. 2, the steel B to which P and Mo are added has both favorable magnetic properties and favorable surface appearance especially when the pickling loss is 40 g/m² or more and 100 g/m² or less. Meanwhile, the steel A to which P and Mo are not added has a small iron loss reduction margin and has a noticeable whitish stripe pattern on its surface appearance even when the pickling loss is 40 g/m² or more and 100 g/m² or less.

Next, to find the reason why the steel with addition of P and Mo has a large iron loss improvement margin and favorable surface appearance in the above-mentioned range of the pickling loss, the surface of each steel sheet after hot band annealing and pickling was studied by SEM observation. The result shows that, in the steel A without addition of P and Mo, a part having a lot of residual scale even when the pickling time is long and the pickling loss is large and a part where grain boundaries of the steel substrate are eroded by pickling are noticeable. In the steel B with addition of P and Mo, on the other hand, no residual scale is seen even with a pickling time of about 30 seconds, and a part where the grain boundary of the steel substrate is eroded is hardly observed even with the condition of a long pickling time.

The results described above suggest the following. The above-mentioned phenomenon is attributable to the reason that the addition of P facilitates the removal of scale on the steel sheet and that the addition of Mo suppresses the erosion of the steel substrate after the scale is removed. When P and Mo are not added, on the other hand, once scale that is easy to pickle is removed, the steel substrate portion becomes preferentially susceptible to erosion, and the surface state where scale tends to remain continues even when pickling is performed for a long time.

The optimum amounts of added P and Mo were studied next.

Steel containing 0.0025% C, 3.5% Si, 0.0010% Al, 0.07% Mn, 0.0012% S, and 0.0018% N and further containing P the content of which is changed from 0.01% to 0.3% and Mo the content of which is changed from 0% to 0.1% was melted, heated at 1100° C., and then hot-rolled to a thickness of 2.0 mm. Following this, the hot-rolled steel sheet was subjected to hot band annealing at 1000° C. for 30 seconds in a 100% $N_2$ atmosphere. The sheet was then pickled under the condition of 7% HCl at 80° C. for 60 seconds. After this, the sheet was cold rolled to a sheet thickness of 0.35 mm, and subjected to final annealing at 1025° C. for 10 seconds in a 20% $H_2$ and 80% $N_2$ atmosphere. Apart from this, the samples after hot band annealing and before and after pickling were collected, and the pickling loss was measured.

Figure 3:
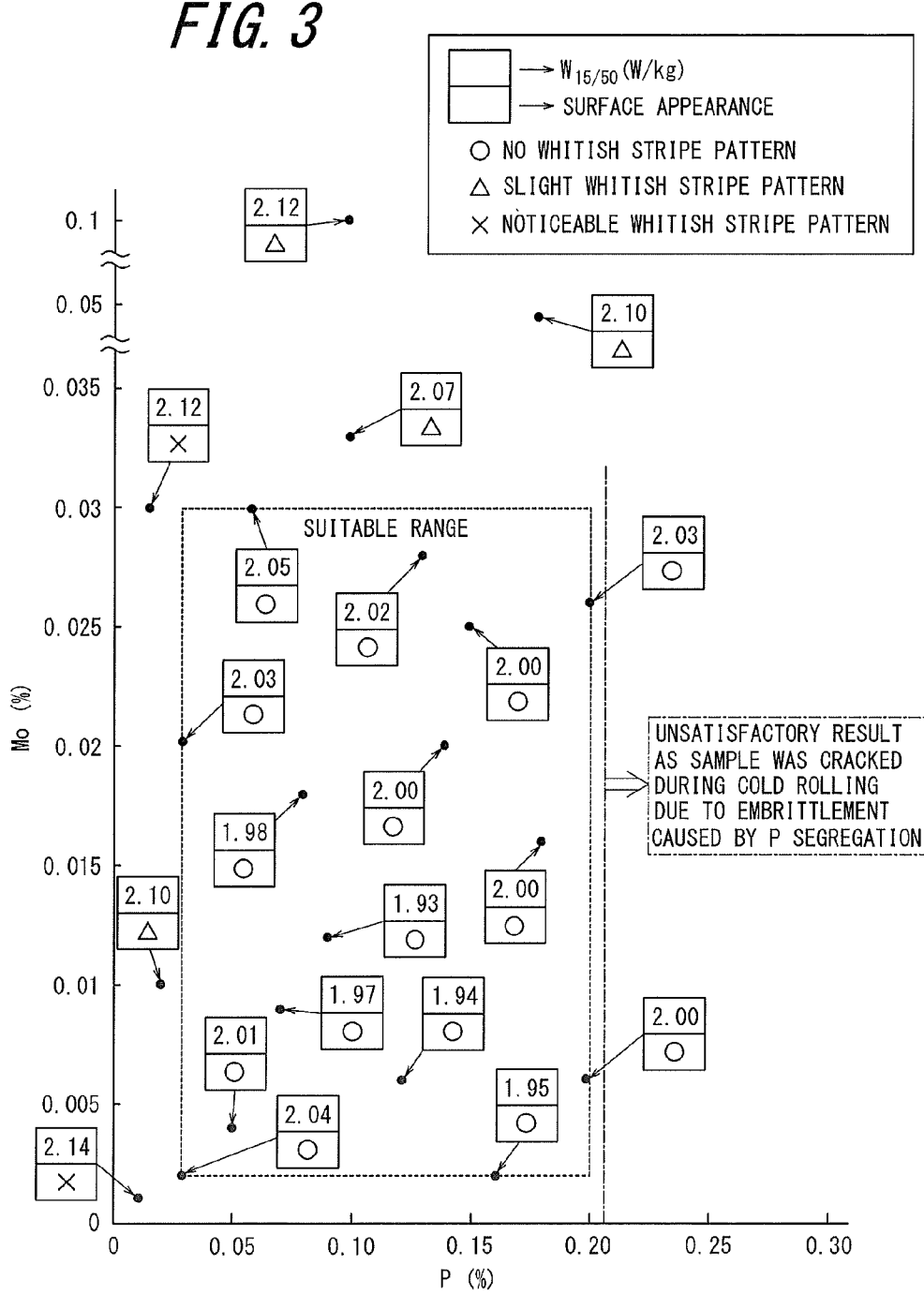
FIG. 3 is a diagram showing the result of studying the iron loss $W_{15/50}$ and the surface appearance in the added amount of P and Mo in each material under test.

FIG. 3 shows the relationship between the amounts of added P and Mo in the material under test and the iron loss $W_{15/50}$ and the surface appearance. As seen from FIG. 3, reduced iron loss and improved surface appearance are obtained from 0.03% to 0.2% P and from 0.002% to 0.03% Mo. The pickling loss of the sample after hot band annealing in the above-mentioned range of the amounts of added P and Mo is 40 g/m² or more and 100 g/m² or less under the condition of immersing in a solution of 7% HCl at 80° C. for 60 seconds.

The manufacturing conditions of the hot-rolled steel sheet to achieve favorable magnetic properties and surface appearance were further examined.

A steel slab having a chemical composition of 0.0013% C, 1.9% Si, 0.0015% Al, 0.10% Mn, 0.0009% S, 0.0026% N, 0.12% P, and 0.01% Mo was prepared, heated at 1100° C., and hot-rolled to a thickness of 2.2 mm at different finisher delivery temperatures and coiling temperatures after completion of hot rolling. Each sheet was then subjected to hot band annealing at 1000° C. for 30 seconds in a nitrogen atmosphere, and pickled under the condition of 7% HCl at 80° C. for 60 seconds. After this, the sheet was cold rolled to a sheet thickness of 0.50 mm, and subjected to final annealing at 1000° C. for 10 seconds in a 20% $H_2$ and 80% $N_2$ atmosphere.

Epstein test pieces were cut from each obtained steel sheet in the rolling direction and the direction orthogonal to the rolling direction, and the magnetic properties were measured. The magnetic properties were evaluated in terms of L+C property (the property measured using the test pieces in the rolling direction and the test pieces in the direction orthogonal to the rolling direction one half each). The surface appearance was also examined.

Figure 4:
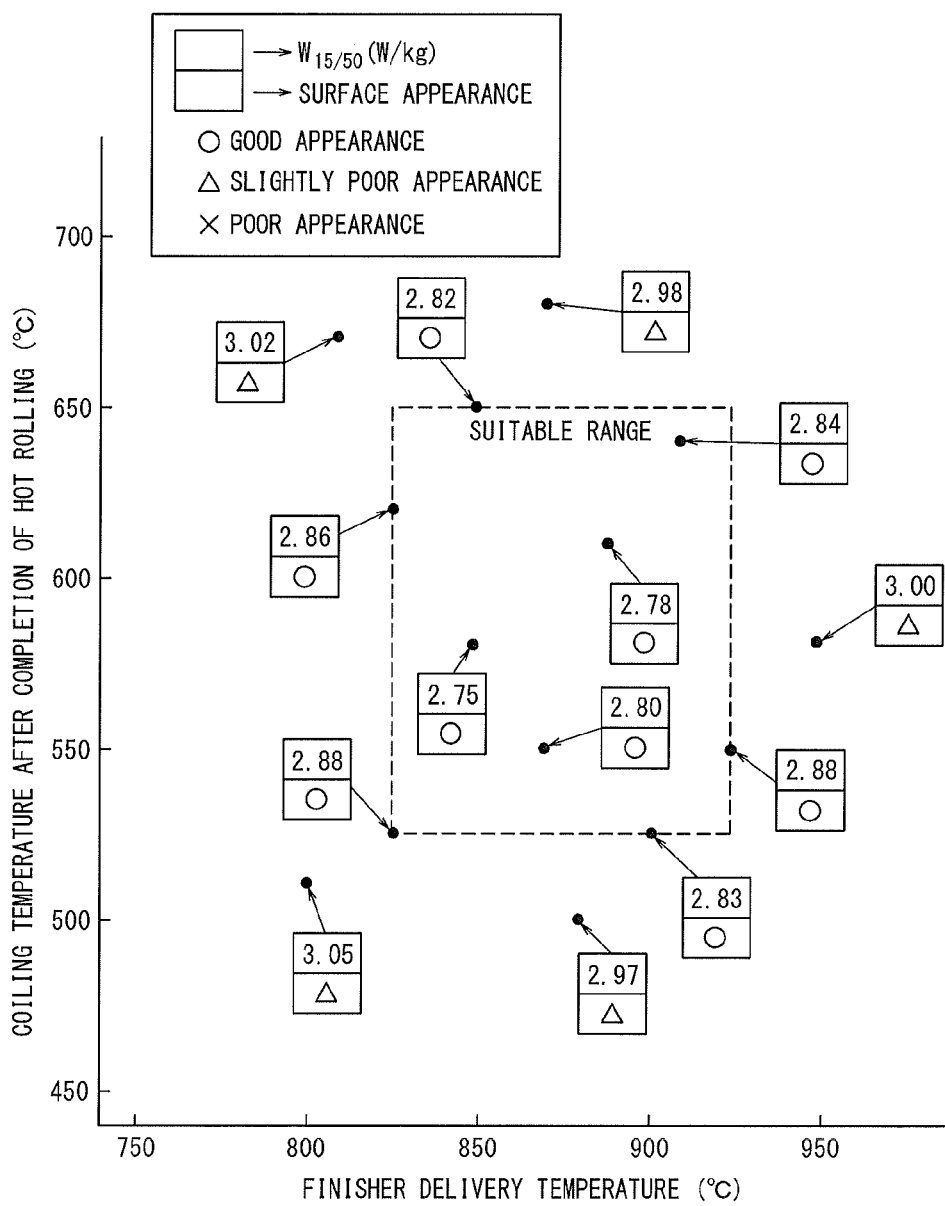
FIG. 4 is a diagram showing the influence of the finisher delivery temperature and the coiling temperature after completion of hot rolling on the iron loss $W_{15/50}$ and the surface appearance.

FIG. 4 shows the influence of the finisher delivery temperature and the coiling temperature after completion of hot rolling on the iron loss $W_{15/50}$ and the surface appearance. As seen from FIG. 4, both a large iron loss reduction effect and favorable surface appearance are achieved when the finisher delivery temperature is 825° C. or more and 925° C. or less and the coiling temperature after completion of hot rolling is 525° C. or more and 650° C. or less.

Although the reason why the removability of scale on the surface of the steel sheet improves when the finisher delivery temperature and the coiling temperature after completion of hot rolling are controlled in these respective ranges is not clear, we believe that, by satisfying these temperature ranges when adding P and Mo, the form/characteristics of oxidized scale generated on the hot-rolled steel sheet become advantageous for the scale removal in the subsequent process.

The following describes the reasons of the limitations of the chemical composition ranges as determined above.

C: 0.005% or Less

The C content is preferably as low as possible to suppress degradation by magnetic aging of the steel sheet, but 0.005% or less is allowable. The C content is preferably 0.0035% or less. Meanwhile, the C content has no particular lower limit, and may be 0%. It is, however, industrially difficult to set the C content to 0%, and the C content is usually 0.0005% or more.

Si: 1.5% or More and 4.5% or Less

Si is a useful element to increase the electrical resistance and improve iron loss. The Si content needs to be 1.5% or more to achieve this improving effect of iron loss property. Meanwhile, if the Si content exceeds 4.5%, the workability of the steel sheet decreases and also the magnetic flux density decreases significantly. The Si content is accordingly limited to 1.5% to 4.5%.

Al: 0.005% or Less

Al is commonly used as a deoxidizer for steel, as with Si. Al has a significant effect of increasing the electrical resistance and reducing the iron loss, and so is typically one of the main constituent elements of a non-oriented electrical steel sheet. To obtain an electrical steel sheet that has high magnetic flux density, low iron loss and excellent recyclability however, the Al content needs to be low. From this perspective, the Al content is 0.005% or less. The Al content is preferably 0.004% or less. Meanwhile, the Al content has no particular lower limit, and may be 0%.

Mn: 0.20% or Less

Mn is a useful element that not only has the effect of increasing the electrical resistance and reducing the iron loss as with Si but also has the solid solution strengthening ability for steel. Accordingly, about 0.20% Mn is typically added in a non-oriented electrical steel sheet. To improve recyclability, however, Si as a main component is advantageous. Hence, the Mn content is 0.20% or less. Meanwhile, the Mn content has no particular lower limit, which is about 0.03% for productivity and the like.

S: 0.003% or Less

S is an incidentally mixed impurity. If the S content is high, a large amount of sulfide inclusion is formed, which causes an increase in iron loss. The S content is therefore 0.003% or less. Meanwhile, the S content has no particular lower limit, which is about 0.0002% for productivity and the like.

N: 0.003% or Less

N is an incidentally mixed impurity, as with S. If the N content is high, a large amount of nitride is formed, which causes an increase in iron loss. The N content is therefore 0.003% or less. Meanwhile, the N content has no particular lower limit, which is about 0.0005% for productivity and the like.

P: 0.03% or More and 0.2% or Less

P is an essential element to improve the scale removability after hot band annealing and improve the magnetic properties and the surface appearance after final annealing. The P content less than 0.03% does not have sufficient additive effect. The P content exceeding 0.2% causes embrittlement due to segregation, leading to intergranular cracking and deterioration in rollability. The P content is accordingly in the above-mentioned range. The P content is preferably 0.04% or more and 0.15% or less.

Mo: 0.002% or More and 0.03% or Less

Mo is an essential additive element to improve scale removability after hot band annealing and improve the magnetic properties and the surface appearance after final annealing, when used together with P. The Mo content less than 0.002% does not have a sufficient additive effect. The Mo content exceeding 0.03% tends to adversely affect the magnetic properties. The Mo content is accordingly in the above-mentioned range. The Mo content is preferably 0.003% or more and 0.02% or less.

In addition to the above-mentioned basic components, the following elements may be contained as appropriate to improve the magnetic properties and surface characteristics of the non-oriented electrical steel sheet.

Sn, Sb: 0.005% or More and 0.2% or Less

Sn and Sb both have the effect of improving the texture of the non-oriented electrical steel sheet and enhancing the magnetic properties. To achieve this effect, the additive amount of each of Sn and Sb is preferably 0.005% or more, whether added alone or in combination. Meanwhile, excessive addition embrittles the steel, and increases defects such as scabs and sheet breakage during steel sheet manufacture. Accordingly, the additive amount of each of Sn and Sb is preferably 0.2% or less, whether added alone or in combination.

Ca: 0.001% or More and 0.005% or Less

Ca is a component that precipitates as CaS, and is effective to improve iron loss by suppressing precipitation of fine sulfides. The Ca content less than 0.001% does not have sufficient additive effect. The Ca content exceeding 0.005% increases Ca oxide inclusion and degrades the iron loss property. Hence, the addition of Ca is preferably in the above-mentioned range.

Cr: 0.05% or More and 0.5% or Less

Cr is an effective component to improve the surface appearance and the iron loss property by modification of the surface layer scale generated on the hot-rolled steel sheet and during hot band annealing. The effect is apparent when 0.05% or more Cr is added, but saturates when the Cr content exceeds 0.5%. Therefore, the addition of Cr is preferably 0.05% or more and 0.5% or less.

The balance other than the components described above is Fe and incidental impurities mixed during the manufacturing process.

The following describes the reasons of the limitations of various manufacturing conditions of the hot-rolled steel sheet.

In manufacturing a non-oriented electrical steel sheet using a hot-rolled steel sheet, the process and facility applied to typical non-oriented electrical steel sheets may be used except the below-mentioned manufacturing conditions of the hot-rolled steel sheet.

For example, steel melted in a predetermined chemical composition in a converter, an electric furnace or the like is secondary-refined in a degasser, formed into a steel slab by blooming subsequent to continuous casting or ingot casting, and hot-rolled into a hot-rolled steel sheet.

Next, manufacturing processes such as hot band annealing, pickling, cold or warm rolling, final annealing, and insulating coating application and baking are performed to obtain a non-oriented electrical steel sheet. Direct casting may be used to directly produce a steel sheet from a thin slab or thinner cast steel having a thickness of 100 mm or less.

The manufacturing conditions of the hot-rolled steel sheet need to be particularly controlled as follows.

In detail, hot rolling is performed so that the finisher delivery temperature is 825° C. or more and 925° C. or less and the coiling temperature after completion of hot rolling is 525° C. or more and 650° C. or less.

The finisher delivery temperature is preferably 850° C. or more and 900° C. or less, and the coiling temperature after completion of hot rolling is preferably 550° C. or more and 625° C. or less.

These conditions of the hot rolling process, together with the efficacy of the material components such as P and Mo mentioned above, contribute to favorable removability of scale generated in the surface layer portion of the steel sheet after hot band annealing. To determine scale removability, the pickling loss after annealing at 1000° C. for 30 seconds in a nitrogen atmosphere and immersion in a solution of 7% HCl at 80° C. for 60 seconds is used in consideration of representative hot band annealing conditions and pickling conditions. We provide particularly favorable scale removability with the pickling loss being 40 g/m$^2$ or more and 100 g/m$^2$ or less.

To determine the properties of the hot-rolled steel sheet that result in favorable magnetic properties and surface appearance, the above-mentioned pickling loss, i.e., the pickling loss when the hot-rolled steel sheet is annealed at 1000° C. for 30 seconds and then subjected to pickling under the conditions of immersion in a solution of 7% HCl at 80° C. for 60 seconds is used. However, the hot band annealing conditions (typically 950° C. or more and 1100° C. or less) and the scale removal conditions such as pickling which are actually used in non-oriented electrical steel sheet manufacture may be optionally set according to the required product properties, the scale generation circumstances, and so on, and are not limited to the above-mentioned conditions.

EXAMPLES

Example 1

Molten steel obtained by blowing in a converter was subjected to degassing treatment and then cast to produce each steel slab whose components are shown in Table 1. Then, each slab was heated under the conditions of 1130° C. for 1 hour, and hot-rolled to a thickness of 2.0 mm under the conditions of the finisher delivery temperature and the coiling temperature after completion of hot rolling shown in Table 2 to obtain a hot-rolled steel sheet. The hot-rolled steel sheets were then subjected to hot band annealing at 1000° C. for 30 seconds in a 100% $N_2$ atmosphere, subjected to pickling treatment of immersing in a solution of 7% HCl at 80° C. for 60 seconds, and cold rolled to a sheet thickness shown in Table 2. Following this, the steel sheets were subjected to final annealing under the conditions of 1030° C. for 10 seconds in a 20% $H_2$ and 80% $N_2$ atmosphere, and then, the insulating coating was applied.

Epstein test pieces were cut from each obtained non-oriented electrical steel sheets in the rolling direction and the direction orthogonal to the rolling direction, and the magnetic properties (iron loss: $W_{15/50}$, magnetic flux density: $B_{50}$) were measured. The magnetic properties were evaluated in terms of L+C property, and the surface appearance was also examined Table 2 shows the obtained results.

hot-rolled to a thickness of 1.6 mm under the conditions of the finisher delivery temperature and the coiling temperature after completion of hot rolling shown in Table 4. The hot-rolled steel sheets were then subjected to hot band annealing at 1000° C. for 30 seconds in a 100% $N_2$ atmosphere, subjected to pickling treatment under the conditions of immersion in a solution of 7% HCl at 80° C. for 60

TABLE 1

Table 1

Steel slab components

| Steel symbol | C (%) | Si (%) | Al (%) | Mn (%) | S (%) | N (%) | P (%) | Mo (%) | Sb (%) | Sn (%) | Ca (%) | Remarks |
|---|---|---|---|---|---|---|---|---|---|---|---|---|
| A | 0.0027 | 1.82 | 0.010 | 0.20 | 0.0025 | 0.0018 | 0.010 | 0.004 | — | 0.041 | — | Comparative steel |
| B | 0.0030 | 1.78 | 0.003 | 0.12 | 0.0015 | 0.0022 | 0.102 | 0.003 | — | 0.045 | — | Conforming steel |
| C | 0.0015 | 2.49 | 0.002 | 0.09 | 0.0017 | 0.0015 | 0.008 | 0.001 | 0.025 | — | — | Comparative steel |
| D | 0.0021 | 2.53 | 0.001 | 0.06 | 0.0023 | 0.0027 | 0.083 | 0.006 | 0.030 | — | — | Conforming steel |
| E | 0.0012 | 3.35 | 0.004 | 0.10 | 0.0012 | 0.0014 | 0.021 | 0.02 | — | 0.053 | — | Comparative steel |
| F | 0.0014 | 3.28 | 0.002 | 0.08 | 0.0008 | 0.0012 | 0.067 | 0.01 | — | 0.050 | — | Conforming steel |
| G | 0.0024 | 3.67 | 0.004 | 0.05 | 0.0024 | 0.0025 | 0.015 | 0.008 | — | 0.035 | 0.0028 | Comparative steel |
| H | 0.0018 | 3.72 | 0.004 | 0.10 | 0.0028 | 0.0028 | 0.033 | 0.002 | — | 0.035 | 0.0032 | Conforming steel |
| I | 0.0025 | 3.69 | 0.003 | 0.15 | 0.0021 | 0.0020 | 0.165 | 0.001 | — | — | — | Comparative steel |

% in Table is mass %

TABLE 2

Table 2

| No. | Steel symbol | Finisher delivery temperature (° C.) | Coiling temperature (° C.) | Pickling loss after hot band annealing (g/m²) | Cold rolled sheet thickness (mm) | $W_{15/50}$ (W/kg) | $B_{50}$ (T) | Surface appearance | Remarks |
|---|---|---|---|---|---|---|---|---|---|
| 1 | A | 900 | 630 | 32 | 0.50 | 3.02 | 1.75 | Entirely poor | Comparative Example |
| 2 | B | 900 | 630 | 75 | 0.50 | 2.77 | 1.77 | Good | Invention Example |
| 3 | C | 900 | 630 | 28 | 0.50 | 2.90 | 1.73 | Entirely poor | Comparative Example |
| 4 | D | 900 | 630 | 66 | 0.50 | 2.63 | 1.75 | Good | Invention Example |
| 5 | E | 850 | 580 | 21 | 0.50 | 2.64 | 1.70 | Entirely poor | Comparative Example |
| 6 | F | 850 | 580 | 53 | 0.50 | 2.44 | 1.72 | Good | Invention Example |
| 7 | G | 850 | 580 | 20 | 0.50 | 2.56 | 1.69 | Entirely poor | Comparative Example |
| 8 | H | 850 | 580 | 47 | 0.50 | 2.32 | 1.71 | Good | Invention Example |
| 9 | I | 850 | 600 | 150 | 0.50 | 2.48 | 1.70 | Partly poor | Comparative Example |
| 10 | B | 800 | 500 | 34 | 0.35 | 2.52 | 1.76 | Partly poor | Comparative Example |
| 11 | B | 850 | 600 | 70 | 0.35 | 2.38 | 1.77 | Good | Invention Example |
| 12 | D | 800 | 500 | 31 | 0.35 | 2.40 | 1.74 | Partly poor | Comparative Example |
| 13 | D | 850 | 600 | 68 | 0.35 | 2.26 | 1.75 | Good | Invention Example |
| 14 | F | 950 | 670 | 123 | 0.35 | 2.15 | 1.71 | Partly poor | Comparative Example |
| 15 | F | 900 | 630 | 57 | 0.35 | 2.05 | 1.72 | Good | Invention Example |
| 16 | H | 950 | 670 | 135 | 0.35 | 2.07 | 1.70 | Partly poor | Comparative Example |
| 17 | H | 900 | 630 | 50 | 0.35 | 1.98 | 1.71 | Good | Invention Example |

As shown in Table 2, the pickling loss after hot band annealing at 1000° C. for 30 seconds and immersion in a solution of 7% HCl at 80° C. for 60 seconds was 40 g/m² or more and 100 g/m² or less in all our Examples.

Moreover, all of our Examples obtained with the manufacturing conditions of the hot-rolled steel sheet according to our methods exhibited favorable results in both the magnetic properties and the surface appearance.

Example 2

Molten steel obtained by blowing in a converter was subjected to degassing treatment and then cast to produce each steel slab whose components are shown in Table 3. Then, each slab was heated at 1100° C. for 1 hour, and seconds, and cold rolled to a sheet thickness shown in Table 4. Following this, the steel sheets were subjected to final annealing under the conditions of 1000° C. for 10 seconds in a 20% $H_2$ and 80% $N_2$ atmosphere, and then, the insulating coating was applied.

Epstein test pieces were cut from each obtained non-oriented electrical steel sheet in the rolling direction and the direction orthogonal to the rolling direction, and the magnetic properties (iron loss: $W_{10/400}$, magnetic flux density: $B_{50}$) were measured. The magnetic properties were evaluated in terms of L+C property, and the surface appearance was also examined Table 4 shows the obtained results.

TABLE 3

Table 3

| Steel symbol | Steel slab components | | | | | | | | | | | | Remarks |
|---|---|---|---|---|---|---|---|---|---|---|---|---|---|
| | C (%) | Si (%) | Al (%) | Mn (%) | S (%) | N (%) | P (%) | Mo (%) | Sb (%) | Sn (%) | Ca (%) | Cr (%) | |
| J | 0.0020 | 3.53 | 0.002 | 0.13 | 0.0021 | 0.0019 | <u>0.013</u> | 0.004 | — | 0.043 | — | — | Comparative steel |
| K | 0.0010 | 3.57 | 0.002 | 0.16 | 0.0019 | 0.0020 | 0.082 | 0.004 | — | 0.045 | 0.0035 | — | Conforming steel |
| L | 0.0016 | 3.54 | 0.003 | 0.07 | 0.0025 | 0.0027 | 0.071 | 0.006 | 0.015 | 0.040 | 0.0040 | 0.07 | Conforming steel |
| M | 0.0035 | 4.02 | 0.001 | 0.05 | 0.0011 | 0.0017 | <u>0.007</u> | <u>0.001</u> | 0.035 | — | — | — | Comparative steel |
| N | 0.0045 | 3.96 | 0.003 | 0.09 | 0.0005 | 0.0007 | 0.040 | 0.002 | — | — | — | — | Conforming steel |
| O | 0.0033 | 4.05 | 0.002 | 0.08 | 0.0015 | 0.0012 | 0.040 | 0.003 | — | 0.042 | 0.0020 | — | Conforming steel |

% in Table is mass %

TABLE 4

Table 4

| No. | Steel symbol | Finisher delivery temperature (° C.) | Coiling temperature (° C.) | Pickling loss after hot band annealing (g/m²) | Cold rolled sheet thickness (mm) | $W_{10/400}$ (W/kg) | $B_{50}$ (T) | Surface appearance | Remarks |
|---|---|---|---|---|---|---|---|---|---|
| 21 | J | 880 | 610 | 25 | 0.30 | 14.8 | 1.68 | Entirely poor | Comparative Example |
| 22 | K | 880 | 610 | 56 | 0.30 | 13.9 | 1.70 | Good | Invention Example |
| 23 | L | 880 | 610 | 60 | 0.30 | 13.7 | 1.70 | Good | Invention Example |
| 24 | M | 840 | 590 | 15 | 0.30 | 14.3 | 1.67 | Entirely poor | Comparative Example |
| 25 | N | 840 | 590 | 52 | 0.30 | 13.5 | 1.69 | Good | Invention Example |
| 26 | O | 840 | 590 | 43 | 0.30 | 13.3 | 1.69 | Good | Invention Example |
| 27 | K | 800 | 500 | 27 | 0.25 | 12.8 | 1.69 | Partly poor | Comparative Example |
| 28 | K | 840 | 590 | 51 | 0.25 | 12.3 | 1.70 | Good | Invention Example |
| 29 | N | 950 | 670 | 118 | 0.25 | 12.2 | 1.68 | Partly poor | Comparative Example |
| 30 | N | 880 | 610 | 55 | 0.25 | 11.8 | 1.69 | Good | Invention Example |

As shown in Table 4, the pickling loss after hot band annealing at 1000° C. for 30 seconds and immersion in a solution of 7% HCl at 80° C. for 60 seconds was 40 g/m² or more and 100 g/m² or less in all our Examples.

Moreover, all of our Examples obtained with the manufacturing conditions of the hot-rolled steel sheet according to our methods exhibited favorable results in both the magnetic properties and the surface appearance.

The invention claimed is:

1. A hot-rolled steel sheet for production of a non-oriented electrical steel sheet, the hot-rolled steel sheet having 1) a chemical composition consisting of, in mass %; 0.005% or less C; 1.5% or more and 4.5% or less Si; 0.005% or less Al; 0.20% or less Mn; 0.003% or less S; 0.003% or less N; 0.03% or more and 0.2% or less P; and 0.002% or more and 0.03% or less Mo with balance being Fe and incidental impurities, and 2) a pickling loss of 40 g/m² or more and 100 g/m² or less when the hot-rolled steel sheet is subjected to annealing at 1000° C. for 30 seconds in a nitrogen atmosphere and then immersed in a solution of 7% HCl at 80° C. for 60 seconds.

2. A hot-rolled steel sheet for production of a non-oriented electrical steel sheet, the hot-rolled steel sheet having 1) a chemical composition consisting of, in mass %, 0.005% or less C; 1.5% or more and 4.5% or less Si; 0.005% or less Al; 0.20% or less Mn; 0.003% or less S; 0.003% or less N; 0.03% or more and 0.2% or less P; 0.002% or more and 0.03% or less Mo, and at least one selected from: 0.005% or more and 0.2% or less Sb; 0.005% or more and 0.2% or less Sn; and 0.05% or more and 0.5% or less Cr, with balance being Fe and incidental impurities, and 2) a pickling loss of 40 g/m² or more and 100 g/m² or less when the hot-rolled steel sheet is subjected to annealing at 1000° C. for 30 seconds in a nitrogen atmosphere and then immersed in a solution of 7% HCl at 80° C. for 60 seconds.

3. A method of manufacturing a hot-rolled steel sheet for production of a non-oriented electrical steel sheet, comprising:
heating a slab having a chemical composition consisting of, in mass %: 0.005% or less C; 1.5% or more and 4.5% or less Si; 0.005% or less Al; 0.20% or less Mn; 0.003% or less S; 0.003% or less N; 0.03% or more and 0.2% or less P; and 0.002% or more and 0.03% or less Mo with balance being Fe and incidental impurities;
hot rolling the slab to obtain a hot-rolled steel sheet; and coiling the hot-rolled steel sheet,
wherein a finisher delivery temperature in the hot rolling is 825° C. or more and 925° C. or less, and a coiling temperature after completion of the hot rolling is 525° C. or more and 650° C. or less.

4. A method for manufacturing a hot-rolled steel sheet for production of a non-oriented electrical steel sheet, comprising:
heating a slab having a chemical composition consisting of, in mass %: 0.005% or less C; 1.5% or more and 4.5% or less Si; 0.005% or less Al; 0.20% or less Mn; 0.003% or less S; 0.003% or less N; 0.03% or more and 0.2% or less P; and 0.002% or more and 0.03% or less Mo, and at least one selected from: 0.005% or more and 0.2% or less Sb; 0.005% or more and 0.2% or less Sn; and 0.05% or more and 0.5% or less Cr, with balance being Fe and incidental impurities,
hot rolling the slab to obtain a hot-rolled steel sheet; and coiling the hot-rolled steel sheet,
wherein a finisher delivery temperature in the hot rolling is 825° C. or more and 925° C. or less, and a coiling temperature after completion of the hot rolling is 525° C. or more and 650° C. or less.

* * * * *